(12) United States Patent
Chung

(10) Patent No.: US 10,308,748 B2
(45) Date of Patent: Jun. 4, 2019

(54) LIGNIN-CONTAINING POLYMERS

(71) Applicant: Florida State University Research Foundation, Inc., Tallahassee, FL (US)

(72) Inventor: Hoyong Chung, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 2 days.

(21) Appl. No.: 15/614,942

(22) Filed: Jun. 6, 2017

(65) Prior Publication Data

US 2017/0335042 A1 Nov. 23, 2017

Related U.S. Application Data

(62) Division of application No. 15/012,113, filed on Feb. 1, 2016, now Pat. No. 9,701,777.

(60) Provisional application No. 62/111,410, filed on Feb. 3, 2015.

(51) Int. Cl.
| | |
|---|---|
| *C08L 51/00* | (2006.01) |
| *C08F 265/02* | (2006.01) |
| *C08F 267/10* | (2006.01) |
| *C08G 81/02* | (2006.01) |
| *G02B 1/04* | (2006.01) |

(52) U.S. Cl.
CPC .......... *C08F 265/02* (2013.01); *C08F 267/10* (2013.01); *C08G 81/02* (2013.01); *C08L 51/003* (2013.01); *G02B 1/04* (2013.01); *C08F 2438/03* (2013.01); *C08L 2205/025* (2013.01); *C08L 2205/05* (2013.01)

(58) Field of Classification Search
CPC .................. C08F 2438/03; C08L 2205/05
See application file for complete search history.

(56) References Cited

FOREIGN PATENT DOCUMENTS

WO WO 2014/116672 * 7/2014

OTHER PUBLICATIONS

Gupta et al., Polymer-Grafted Lignin Surfactants Prepared via Reversible Addition—Fragmentation Chain-Transfer Polymerization, Langmuir 2014, 30, 9303-9312.*

* cited by examiner

*Primary Examiner* — Jeffrey C Mullis
(74) *Attorney, Agent, or Firm* — Christopher M. Ramsey; GrayRobinson, P.A.

(57) ABSTRACT

Click reactions may be used to bond polymers to lignin by taking advantage of lignin's terminal hydroxyl and thiol groups via an alkyne-azide click reaction or a thiol-alkene or thiol-alkyne click reaction. By selecting functional polymers, these methods may be used to synthesize lignin-containing polymer materials with an array of different properties, such as self-healing polymers.

22 Claims, 15 Drawing Sheets

List of prepared azido-terminated poly(5-acetylaminopentyl acrylate)s

| Entry | [M]/[RAFT]/[I] | Conversion by $^1$H NMR | Mn ($^1$H NMR, g/mol) | Mn (MALLS, g/mol) | PDI |
|---|---|---|---|---|---|
| 1 | 20/1/0.25 | 85% | $6.12 \times 10^3$ | $7.57 \times 10^3$ | 1.08 |
| 2 | 100/1/0.25 | 86% | $2.43 \times 10^4$ | $3.74 \times 10^4$ | 1.29 |
| 3 | 200/1/0.25 | 84% | $3.15 \times 10^4$ | $4.05 \times 10^4$ | 1.33 |
| 4 | 300/1/0.25 | 88% | $3.54 \times 10^4$ | $3.84 \times 10^4$ | 1.37 |
| 5 | 500/1/0.25 | 81% | $4.55 \times 10^4$ | $4.81 \times 10^4$ | 1.49 |

*FIG. 16*

List of prepared lignin-graft-poly(5-acetylaminopentyl acrylate) via click chemistry.

| Entry of lignin-based polymer | Mass ratio of lignin | DP of PAA |
|---|---|---|
| 1 | 10% | 300 |
| 2 | 15% | 300 |
| 3 | 10% | 500 |
| 4 | 15% | 500 |
| 5 | 20% | 500 |
| 6 | 25% | 500 |

*FIG. 17*

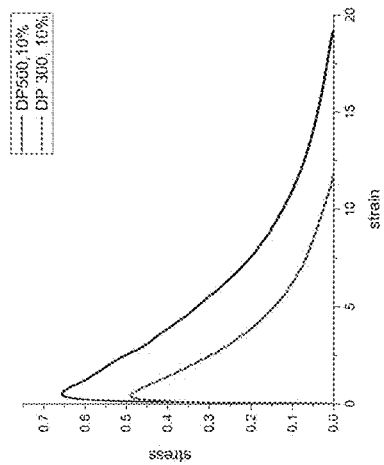
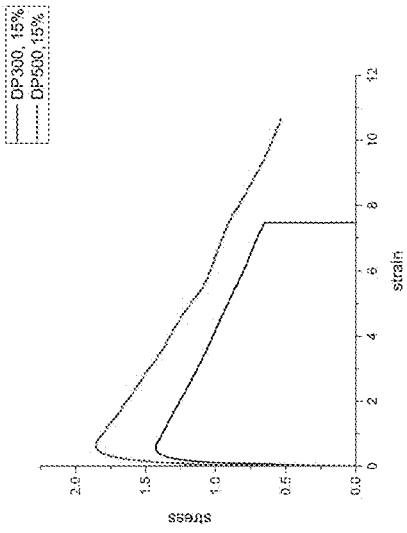
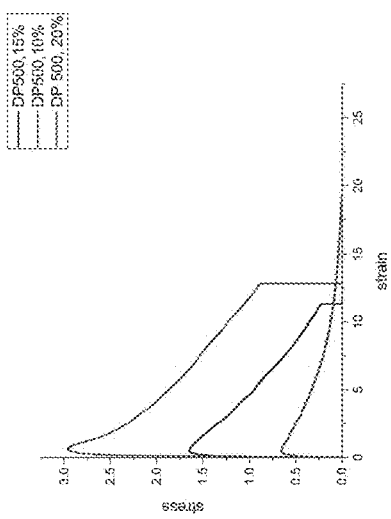
*FIG. 19A*
*FIG. 19B*
*FIG. 19C*

Mechanical properties of DP 300, 10%, 15% and DP 500 10%, 15%

| entry | Energy | Maximum stress | Young's modulus | Strain at break | Strength at break |
|---|---|---|---|---|---|
| DP 300, 10% | 2.75 | 0.565 | 5.87 | 12.67 | 0 |
| DP 500, 10% | 3.96 | 0.66 | 3.76 | 19.18 | 0 |
| DP 300, 15% | 6.61 | 1.66 | 20.43 | 5.61 | 1.13 |
| DP 500, 15% | 10.99 | 1.78 | 29.16 | 11.36 | 0.41 |

Mechanical properties of DP 500, 15%, 20%, 25% (wt) lignin composition

| entry | Energy | Maximum stress | Young's modulus | Strain at break | Strength at break |
|---|---|---|---|---|---|
| DP 500, 10% | 3.96 | 0.66 | 3.76 | 19.18 | 0 |
| DP 500, 15% | 10.99 | 1.63 | 29.16 | 11.36 | 0.41 |
| DP 500, 20% | 21.56 | 2.87 | 72.75 | 12.14 | 0.79 |

1 day, 2 days, 6 days self-healing mechanical properties compared with undamaged DP 500, 20% lignin-graft-PAA copolymer plate.

| Entry | Energy | Max stress | Young's modulus | Strain at break | Stress at break |
|---|---|---|---|---|---|
| undamaged | 21.56 | 2.87 | 72.75 | 12.14 | 0.79 |
| 1 day | 13.07 | 2.69 | 39.39 | 6.07 | 1.94 |
| 2 days | 4.4 | 2.22 | 43.28 | 2.24 | 2.18 |
| 6 days | 2.44 | 2.48 | 53.19 | 0.61 | 2.48 |

LIGNIN-CONTAINING POLYMERS

CROSS-REFERENCE TO RELATED APPLICATIONS

This is a divisional of application Ser. No. 15/012,113, filed Feb. 1, 2016, which claims priority from U.S. provisional Application No. 62/111,410, filed Feb. 3, 2015. The entire contents of these prior applications are incorporated by reference.

FIELD

This relates to the field of polymer chemistry and, more particularly, to incorporating lignin into useful polymer materials.

BACKGROUND

Lignin is the second most abundant plant-based biopolymer after cellulose. It is mostly found in plant cell walls and is an important structural component of plants due to its physical strength. Chemically, lignin is made of a random polymeric network composed of phenylpropane groups. Three monomeric units include coumaryl alcohol, coniferyl alcohol and sinapyl alcohol.

Those three monomeric units undergo a biosynthesis process to form a lignin's polymeric structure. The biosynthesis polymerization yields three types of segments within lignin: p-hydroxyphenyl (H), guaiacyl (G), and syringyl (S). Different plant sources yield different lignin structures because of the difference in concentrations of H, G, and S. For example, lignin from gymnosperms, a type of pine, is comprised largely of G-units with small amount of H-units. Unlike gymnosperms, angiosperm dicots, including many hardwoods, have a mixture of G-units and S-units, which reduce branching concentrations and can improve lignin's processing capability.

FIG. 1 shows the chemical structure of lignin. It has a complex three-dimensional structure with various types of functionalities and covalent links. Lignin's important C—O linkages are the $\beta$-O-4, $\alpha$-O-4 and 4-O-5 linkages and its important C—C linkages are the $\beta$-5, 5-5, $\beta$-1 and $\beta$-13 linkage. Common functional groups in lignin include methoxyl, phenolic hydroxyl, aliphatic hydroxyl and other carbonyl groups.

Smart polymers are useful polymeric materials because they may be self-healing, responsive to external stimuli, or exhibit shape-memory. Stimulus responsive polymers can change conformation upon receiving external stimuli, such as temperature, pH, light, electricity, magnetic field, and mechanical forces. Stimuli responsive polymers are used for a variety of applications including as sensors, drug delivery, tissue engineering, and reconstructive polymer structure.

Self-healing polymers have the ability to heal damage on a bulk structure either by an external stimulus or by spontaneous healing (autonomic healing). Most self-healing mechanisms are inspired from a healing property of natural organisms.

Shape memory polymers alter their dimensions in response to an applied stimulus. For example, the initial shape of a polymer can be temporarily changed with an applied stimulus, but the polymer can deform back to its original shape by applying the same initial stimulus. The shape memory effect can be repeated multiple times and the effect can be designed or predicted depending on the desired applications.

Although lignin is a highly stable material due to its densely packed aromatic groups and high molecular weight, lignin has been underutilized in modern materials. Lignin forms narrowly distributed nano-size beads in solution. From the lignin nanoparticles, hybridization of lignin with synthetic polymers has been shown to be an effective nanocomposite material. Also non-transition metal catalyzed chemical modifications of lignin are an inexpensive method of generating chemically convertible hydroxyl groups for polymeric modification on the surface of the lignin nanoparticles.

The main problems with making lignin-containing materials are: (1) the art's understanding of useful functional groups on lignin is not very advanced; (2) the technology useful for integrate lignin and petroleum-based polymers is not very advanced; (3) the synthesis techniques for well-defined polymers that can be integrated with lignin to make lignin-containing polymer products is not very advanced; (4) there has been little research devoted to combining lignin and petroleum-based polymers; and (5) lignin products are targeting narrowly to the cheap and low quality commodities market.

BRIEF SUMMARY

In view of the foregoing, it would be advantageous to make polymer materials containing lignin using synthesis methods that are reliable and can be adapted to make many different materials with useful properties.

A first method of synthesizing a lignin-containing polymer material, comprises (a) reacting a lignin having terminal hydroxyl groups with an alkyne-carboxylic acid, thereby converting the terminal hydroxyl groups to terminal alkyne groups and forming an alkyne-functionalized lignin; and (b) performing an alkyne-azide click reaction between the alkyne-functionalized lignin and a polymer having an azide group to covalently bond the polymer to the lignin and form the lignin-containing polymer material.

The reaction in (a) may occurs in the presence of dicyclohexylcarbodiimide (DCC), dimethylaminopyridine (DMAP), and dimethylformamide (DMF) and the click reaction in (b) may be catalyzed by a copper (I) compound. The alkyne-carboxylic acid may be hexynoic acid.

The polymer having an azide group may be synthesized from a vinyl based-monomer by RAFT polymerization. "RAFT" is Reversible Addition Fragmentation chain Transfer polymerization.

The polymer includes a diene and/or dienophile group.

The polymer may include at least one amino acid.

The polymer may be a poly-acrylate polymer, such as poly(n-butyl acrylate).

The polymer may include a polyethylene glycol segment.

The lignin-containing polymer material may be 10 wt % to 50 wt % lignin or 10 wt % to 25 wt % lignin.

Another method of synthesizing a lignin-containing polymer material comprises performing a thiol-alkene or thiol-alkyne click reaction between a lignin having terminal thiol groups and a polymer having an alkene group and/or alkyne group to covalently bond the polymer to the lignin and form the lignin-containing polymer material.

The click chemical reaction may be catalyzed by a photoredox catalyst.

The polymer may be synthesized from a vinyl based-monomer by RAFT polymerization.

The polymer may include a diene and/or dienophile group.

The polymer may include at least one amino acid.

The polymer may be a poly-acrylate polymer.

The lignin-containing polymer material may be 10 wt % to 50 wt % lignin.

A self-healing polymer material comprises (a) a first compound containing a lignin-based core with a first plurality of polymers attached thereto; and (b) a second compound containing a lignin-based core with a second plurality of polymers attached thereto. The first and second plurality of polymers interact together sufficiently enough to hold the first and second compounds together to form a monolithic product.

The first and second plurality of polymers may interact together sufficiently enough to hold the first and second compounds together to form a monolithic product by forming a Diels-Alder adduct.

The first and second plurality of polymers may interact together sufficiently enough to hold the first and second compounds together to form a monolithic product by hydrogen bonding.

The first and second plurality of polymers may be attached to their respective lignin-based cores via a triazole ring.

The lignin-based core may have a major dimension of 1-1000 nm, 1-500 nm, 1-250 nm, or 1-100 nm.

BRIEF DESCRIPTION OF THE DRAWINGS

FIG. 16 is a table listing several azido terminated poly (5-acetylaminopentyl acrylate) s that were prepared.

FIG. 17 is a table listing several lignin-containing polymers where the polymer arm is poly (5-acetylaminopentyl acrylate) that was prepared.

FIG. 19A is a set of line graphs of tensile test results for a lignin-poly (5-acetylaminopentyl acrylate) polymer where the polymer had DP=500 and contained 10 wt %, 15 wt %, and 20 wt % lignin.

FIG. 19B is a set of line graphs of tensile test results for a lignin-poly (5-acetylaminopentyl acrylate) polymer where the polymer had DP=300 and 500 and contained 15 wt % lignin.

FIG. 19C is a set of line graphs of tensile test results for a lignin-poly (5-acetylaminopentyl acrylate) polymer where the polymer had DP=500 and 300 and contained 10 wt % lignin.

DETAILED DESCRIPTION OF EXAMPLE EMBODIMENTS

This disclosure describes example method and composition aspects, but not all possible aspects or embodiments of the methods or composition. Where a particular feature is disclosed in the context of a particular aspect or embodiment, that feature can also be used, to the extent possible, in combination with and/or in the context of other aspects and embodiments. The methods and compositions, be embodied in many different forms and should not be construed as limited to only the examples described here.

To join lignin with functional polymers, lignin's hydroxyl groups and/or thiol groups are used to covalently bond the polymers to lignin. The usage of the thiol group in particular, may, in some cases, not require raw lignin to be modified prior to linking it with the polymer. The new methods described here may save time and cost of lignin-containing polymer production.

The synthetic methods described here integrate the lignin and petroleum-based polymers using a process called a "click reaction." The click reaction is generally quite efficient and can be performed under moderate reaction conditions. Among many possible click reactions, the synthetic methods described here take advantage of lignin's terminal hydroxyl groups and thiol groups.

The methods may also take advantage of using polymers that can bond to lignin-via click chemistry reactions and have defined functional properties. By selecting amongst polymers with different structures, the methods can be used to prepare a diverse array of lignin-containing polymeric materials with many different functions. This can yield new multi-functional and smart lignin-containing polymer materials such as self-healing, stimulus responsive, optically valuable, and/or biodegradable polymers.

Figure 1:
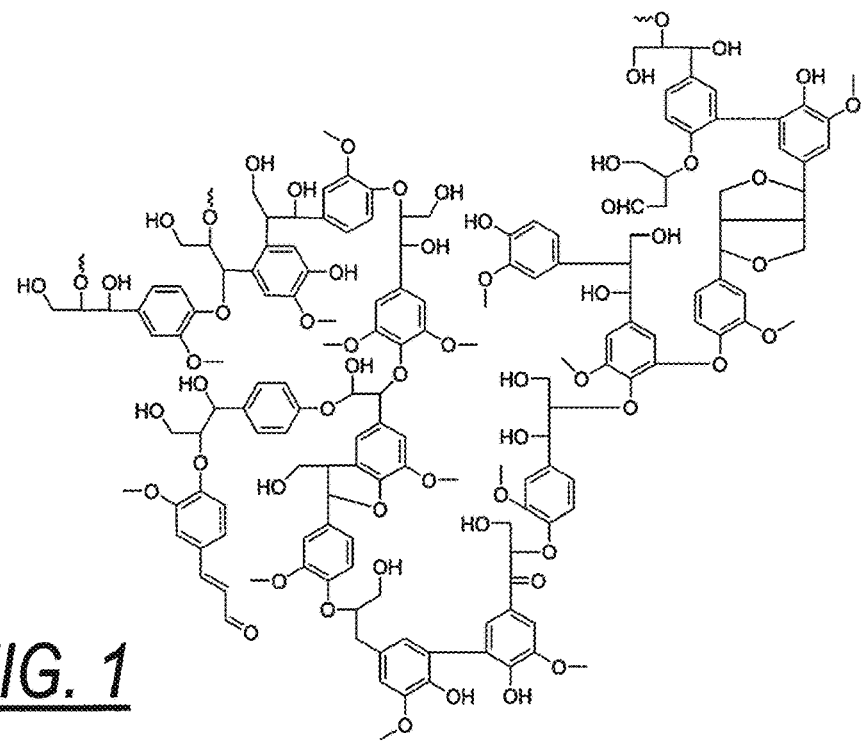
FIG. 1 is a diagram of an example of a chemical structure of lignin.
Figure 2:
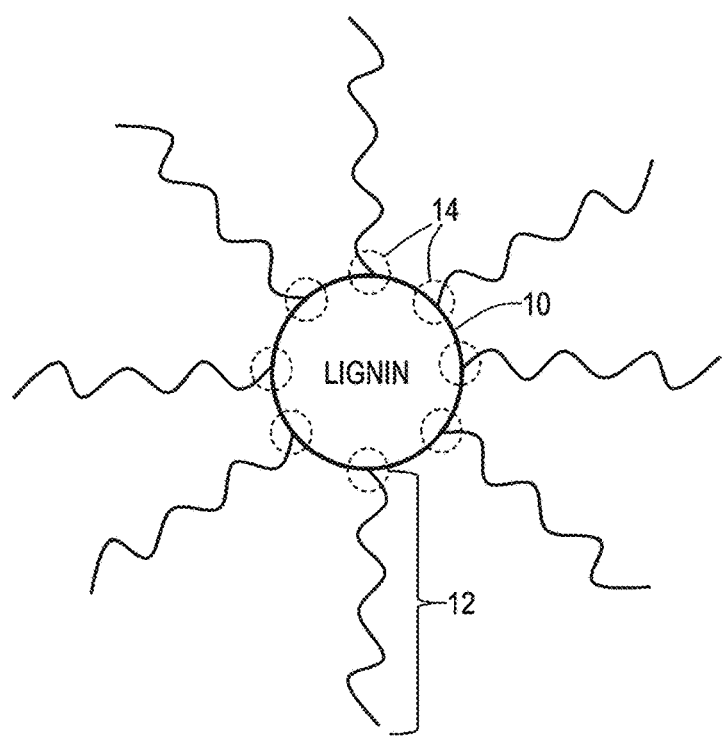
FIG. 2 is a diagram of a lignin-containing polymer material.

FIG. 2 illustrates the general concept of a polymeric material with a lignin core. The lignin core 10 has a plurality of polymer arms 12 attached to the lignin via covalent bonds 14. The polymer arms 12 may be bonded to the lignin core via a click reaction. The lignin based core may have a major dimension of 1-1000 nm, 1-500 nm, 1-250 nm, or 1-100 nm.

The click reactions used in the methods are called the alkyne-azide click reaction and the thiol-alkene click reaction. These reactions are named after the functional groups involved in forming the covalent bond.

The alkyne-azide click reaction may be catalyzed with copper (I) to yield alkyne-azide cycloaddition. The 1,3-dipolar azide-alkyne cycloaddition links azide and terminal alkyne by forming 1,2,3-triazoles. The 1,2,3-triazole is chemically inert and thermally stable without reversible reaction.

The thiol-alkene click reaction manipulates carbon-sulfur bonds. It occurs with base-catalyzed electron-deficient alkene or radical initiated reaction with inactivated olefins. The radical initiation takes place by UV irradiation or thermolysis of reagents. Typically, an organic photoinitiator such as 2,4,6-trimethylbenzoyl-diphenylphosphine oxide, 2,2-dimethoxy-2-phenylacetophenone, benzophenone, and/or 2-hydroxy-4'-(2-hydroxyethoxy)-2-methylpropiophenone, is used to generate radicals through hemolytic cleavage of covalent bonds or abstracting of hydrogen forming thiyl radical.

Another method of radical initiation for the thiol-alkene click reaction is photo-redox catalysis that undergoes a single-electron-transfer process by photoexcitation with absorption of photons. If this method of radical initiation is used, the photo-excited state needs to have a long enough lifetime to prevent rapid deactivation quenching pathways.

Figure 3:
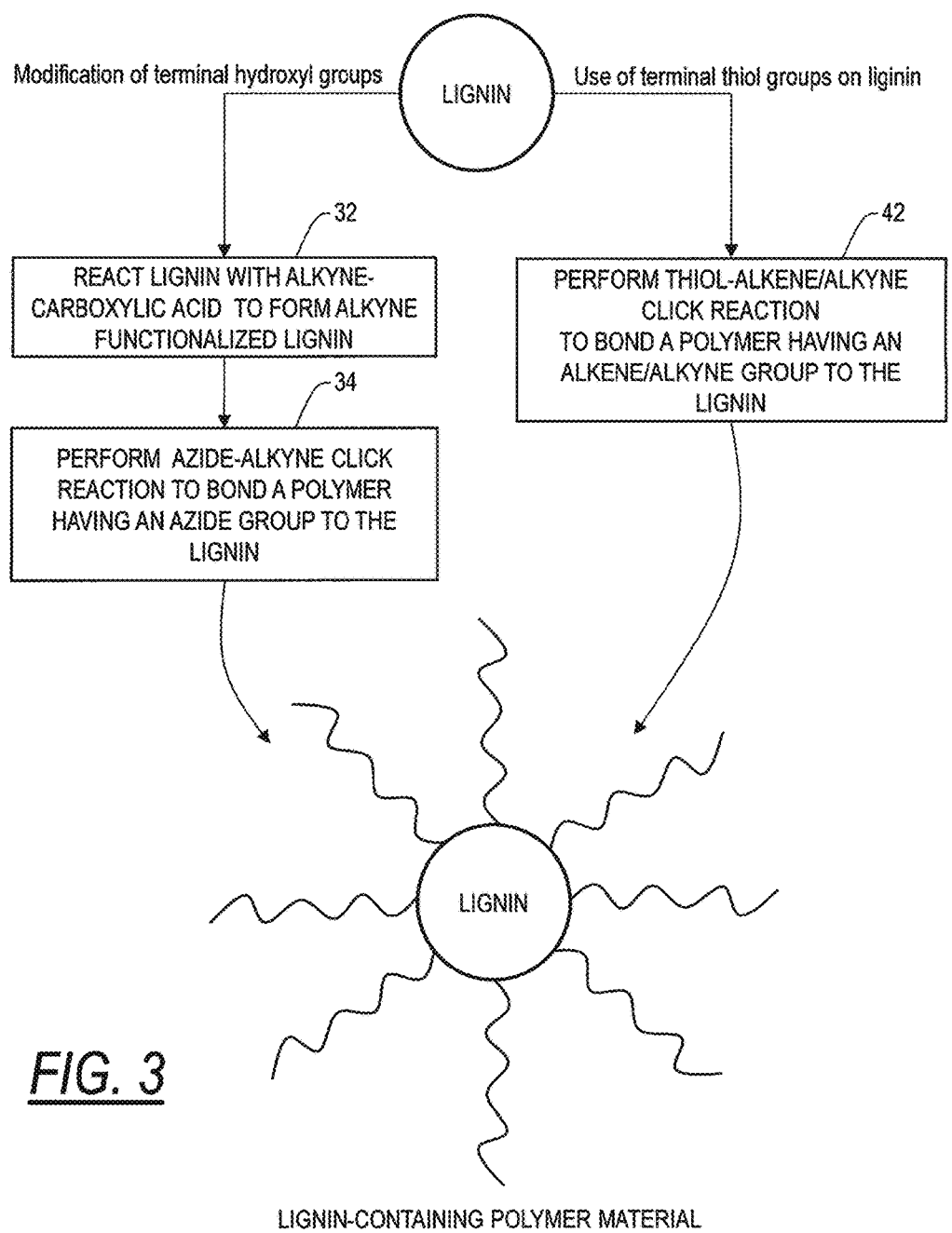
FIG. 3 is a set of flow diagrams illustrating two methods of making lignin-containing polymer materials.

In a first method aspect, the polymer arms are be bonded to the lignin via a click chemical reaction that takes advantage of lignin's terminal hydroxyl groups. Referring to FIG. 3, a lignin-containing polymer material may be synthesized by reacting a lignin having terminal hydroxyl groups with an alkyne-carboxylic acid, thereby converting the terminal hydroxyl groups to terminal alkyne groups and forming an alkyne-functionalized lignin. The alkyne-functionalized lignin is available for an azide-alkyne click reaction (block 32). In block 34, an alkyne-azide click reaction is performed between the alkyne-functionalized lignin and a polymer having an azide group. This click reaction covalently bonds the polymer to the lignin and forms the lignin-containing polymer material.

The reaction in block 32 may be performed in the presence of dicyclohexylcarbodiimide (DCC), 4-Dimethylaminopyridine (DMAP), and dimethylformamide (DMF) or any other set of reactants that can functionalize the lignin with alkynes.

Alkyne-carboxylic acids that can be used may include -ynoic acids where the pre-fix defines the number of carbon atoms. One possible example, hexynoic acid, has 6 carbon atoms.

Figure 5:
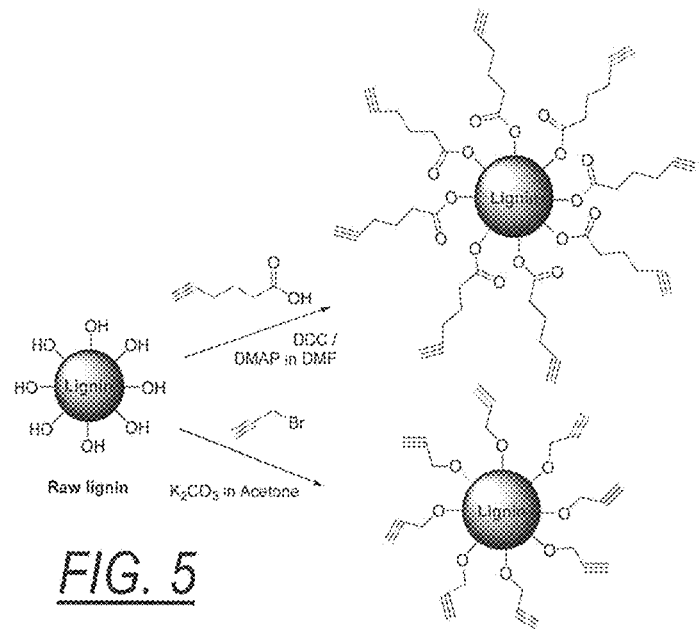
FIG. 5 is a reaction scheme illustrating two routes making an alkyne-functionalized lignin.

FIG. 5 is a reaction scheme illustrating an example of a reaction that forms an alkyne-functionalized lignin. The upper reaction occurs through an ester bond formation between lignin's hydroxyl group and carboxylic acid at 5-hexynoic acid. The lower reaction uses propargyl bromide to form an ether linkage to bond alkyne onto lignin. Lignin's hydroxyl group reacts with propargyl bromide to form aryl ethers. This modification method is efficient and may be completed in a single step.

In a second method aspect, the polymer arms are bonded to the lignin via a click chemical reaction that takes advantage of lignin's thiol groups. Referring to FIG. 3, a polymeric material with a lignin core may be synthesized by performing a thiol-alkene click chemical reaction between a lignin having terminal thiol groups and a polymer having an alkene group to covalently bond the polymer to the lignin and form the lignin-containing polymer material (block 42).

In this method, because lignin naturally contains terminal thiol groups, it may not be necessary to pre-treat lignin to functionalize it with thiol groups prior to performing the thiol-alkene click reaction.

Figure 25:
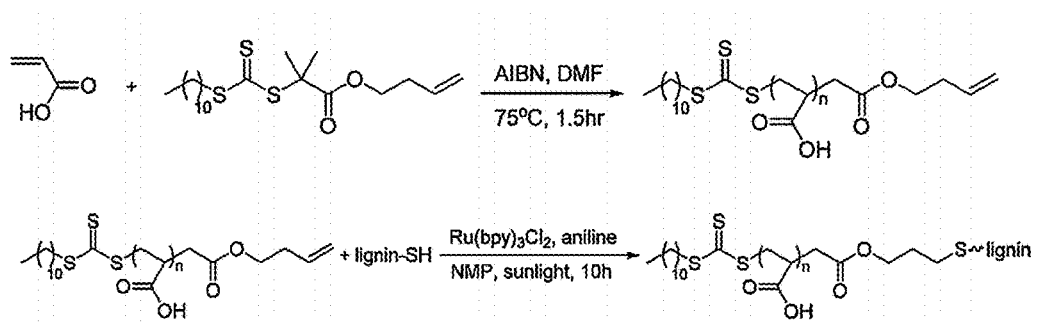
FIG. 25 is a reaction scheme illustrating a photoredox catalyst mediated thiol-alkene click reaction between lignin and poly (acrylic acid) with an alkene group.

FIG. 25 shows an example of photoredox catalyst mediated thiol-alkene click reaction between lignin and poly (acrylic acid). In this method AIBN=azobisisobutyronitrile and NMP=N-methyl-2-pyrrolidone. The poly(acrylic acid) may be prepared by RAFT to have an unsaturated olefin end group as the alkene. The lignin's thiol group reacts with the alkene at poly(acrylic acid)'s terminal group.

By using the thiol groups on lignin, a photo-mediated thiol-alkene click reaction may be conducted. The photo chemically initiated thiol-alkene click reaction may use photo-radical initiators or photoredox catalysts at ambient temperature instead of using a heat and thermal radical initiator.

Representative organic photoinitiators, include for example, 2,4,6-trimethylbenzoyl-d iphenylphosphine oxide, 2,2-dimethoxy-2-phenylacetophenone, benzophenone, and 2-hydroxy-4'-(2-hydroxyethoxy)-2-methylpropiophenone.

Another technique of photo-mediating the thiol-alkene click reaction is using a commercially available photoredox catalyst. Examples of photoredox catalysts include, for example, fac-Ir(ppy)3 (ppy=polypyrrole), Ru(bpy$_3$)Cl$_2$ (bpy=bypyridine), Ru(bpz$_3$)(PF$_6$)$_2$ (bpz=bipyrazine). The photo reaction may proceed with as small as 0.25 mol % of the photoredox catalyst—and those reactions can occur in a wide range of solvents, even in water. The photoredox catalyst may be be activated by a visible sunlight wavelength range, blue light irradiation ($\lambda_{max}$=460 nm).

Using the thiol groups to perform the click reaction and a photoredox initiator/catalyst may open a new important avenue to produce lignin-containing polymers with reduced time and energy costs.

Figure 4:
FIG. 4 is a table summarizing some of the many possible synthetic methods to make lignin-containing polymer materials with different properties.

The table in FIG. 4 illustrates a simplified structure of a lignin-containing polymer with an explanation of each component on the lignin-containing polymer. FIG. 4 provides examples of how versatile the synthetic methods are. The function of the lignin-containing polymers prepared by the methods can be tuned by selecting appropriate polymer arms. FIG. 4 lists several examples of types of polymer arms that form lignin-containing polymers with self-healing, diverse mechanical, and biodegradability properties.

Figure 6:
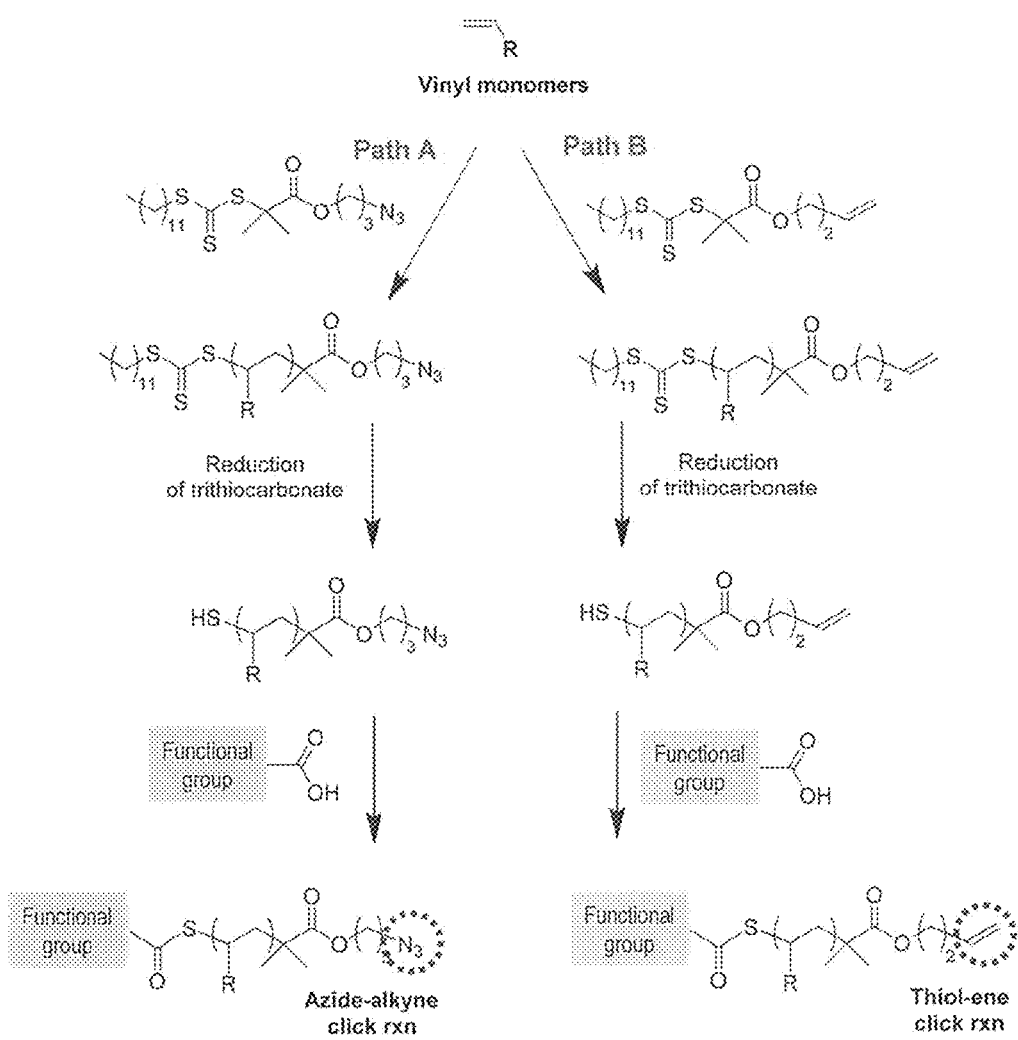
FIG. 6 is a reaction scheme illustrating two paths for preparing polymer arms that can undergo a click reaction.

FIG. 6 illustrates a general synthetic route to make a polymer arm using vinyl-based monomers. The scheme has two routes: path A and path B. Path A is a RAFT polymerization process, which adds an azide to the polymer chain terminal for the click reaction. The chain terminal azide reacts to alkyne containing lignin via an azide-alkyne click reaction. Path B adds an alkene terminal group to the polymer chain for the thiol-alkene click reaction.

The structure of the vinyl monomer can vary due to the fact that that polymerization techniques such as RAFT and ATRP (Atom Transfer Radical Polymerization) are versatile. In FIG. 6, for example, acetyl amino group containing vinyl monomers, amino acid/peptide mimic vinyl monomers, and diene/dienophile containing vinyl monomers can be used. Poly (n-butyl acrylate) and polystyrene may be prepared by the RAFT polymerization method shown in FIG. 6. Poly(n-butyl acrylate) and polystyrene can be used as polymer arms linkable to lignin via the thiol-alkene click reaction.

Extra functional groups can be added to the polymer chain to tunes its chemical or physical properties. As shown in FIG. 6, for example, the trithiocarbonate chain end can be reduced to the thiol end group. A carboxylic acid can be linked to the polymer by forming a thioester linkage.

Lignin Containing Self-Healing Polymers

A self-healing polymer material has (a) a first compound containing a lignin-based core with a first plurality of polymers attached thereto and (b) a second compound containing a lignin-based core with a second plurality of polymers attached thereto. The first and second plurality of polymers interact together sufficiently enough to hold the first and second compounds together to form a monolithic product.

Self-healing polymers can take advantage of a variety of interactions that can hold the first and second compounds together, such as: hydrogen bonding, Diels-Alder reactions/retro Diels-Alder reactions, catalytic polymerization of encapsulated healing reagents, metal-ligand interactions, π-π stacking and ionomers. Hydrogen bonding may be advantageous due to its spontaneous self-healing capability.

Figure 7:
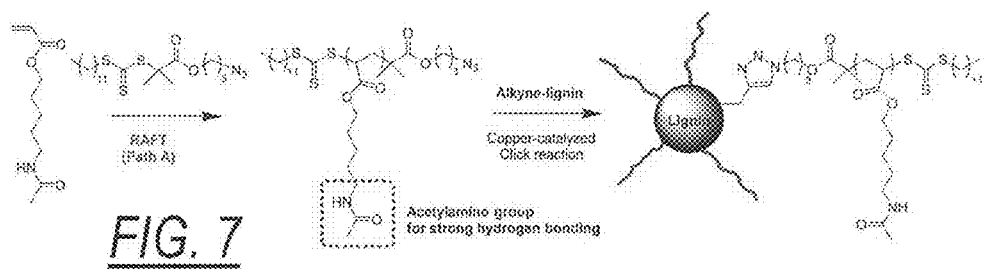
FIG. 7 is a reaction scheme illustrating a method for preparing self-healing lignin-containing polymer.

FIG. 7, is a reaction scheme for making brush polymers prepared from hydrogen bonding donor/accepter containing monomers. These hydrogen bonding polymer chains can be used as the polymer arms bound to lignin.

Figure 8:
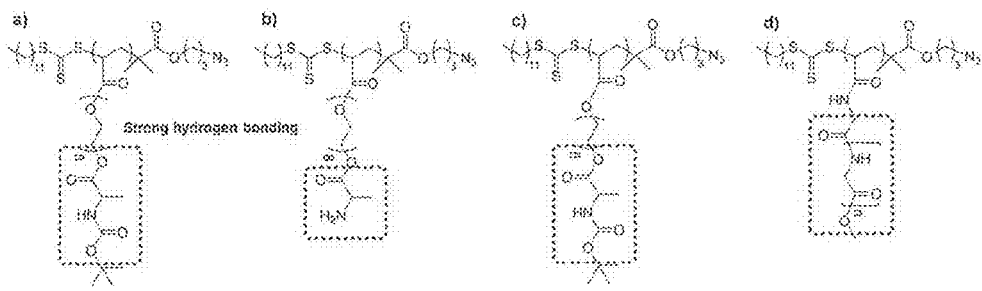
FIG. 8 is a diagram of four examples of polymer arms with amino acids or groups that mimic peptides for hydrogen bonding interactions.

FIG. 8 provides four more examples of polymer arms that can be used for lignin-containing self-healing polymers. These are amino acid/peptide mimicking polymers, which have two parts: (1) a soft segment containing a polyethylene glycol and an alkane segment for modulating the elasticity of the overall polymer chain and (2) a hydrogen bonding segment using a mimic of amino acids and peptides. The polymer shown in example d) of FIG. 9 includes a peptide derived from glycine.

The peptide segment may, for example, contain amino acid sequences of 5-10 residues. Because the peptide segments can experience substantial hydrogen bonding, the mechanical properties of the polymers can be tuned via hydrogen bonding. Without the soft segment, the polymers may be brittle because of hydrogen bonding. The soft segment effectively softens the polymer arms and reduces brittleness.

Figure 9:
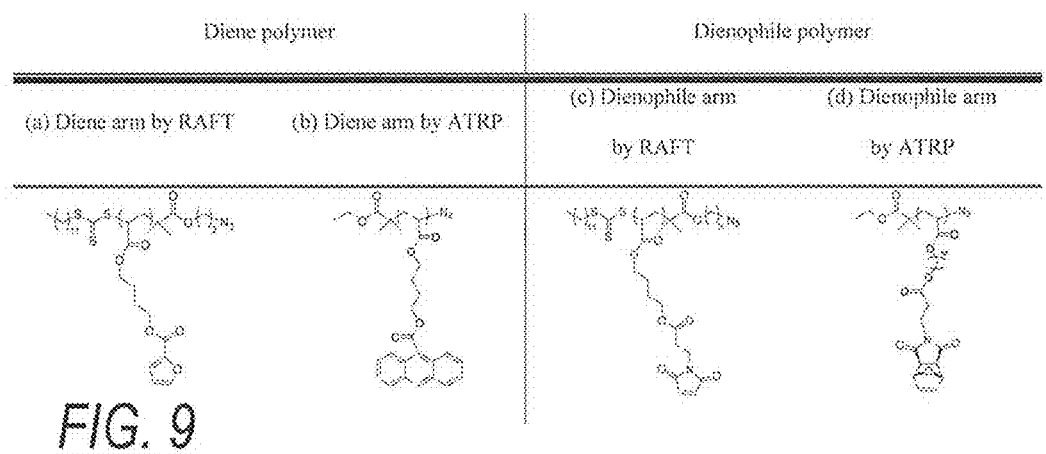
FIG. 9 is a table showing examples of polymer arms with diene and dienophile groups.

The polymers in FIG. 9 can be prepared by RAFT to make a substantially uniform chain length of polymers with narrow molecular weight distribution. During the RAFT process, the polymer can be formed with an azide terminal group as shown or with an alkene terminal group for the appropriate click reaction. FIG. 6 path B represents a RAFT procedure to making the polymer have an alkene terminal group.

Stimulus triggered self-healing is also important mechanism of healing polymers in a controlled manner. For example, deformed/damaged polymers can be healed using a Diels-Alder reaction. The reaction is reversible as a retro Diels-Alder reaction at elevated temperatures, such as at 90-120° C. If there are enough dienophiles and dienes, the damaged polymer matrix can then form other covalent bonds at rejoined interfaces via Diels-Alder reactions and retro-Diels-Alder reactions.

Some examples of diene and dienophile polymers that may be used as polymer arms for making self-healing lignin-containing polymers are shown in FIG. 9. The furan containing acrylate monomer, 4-(acryloyloxy)butyl furan-2-carboxylate in (a) can be synthesized by a reaction between 4-hydroxybutyl acrylate and furoyl chloride. The monomer polymerized by RAFT and the polymer's chemical structure is shown in (a). A dienophile counter part of the polymer in (a) is the maleimide-containing polymer in (c). The click reaction of each furan and maleimide containing polymer to lignin generates a lignin-containing polymer that contains the diene (furan) and dienophile (maleimide). Because a Diels-Alder reaction typically does not occur temperatures lower than 90-120° C., the synthesized lignin core-polymer arm is substantially stable at ambient temperatures or temperatures below about 90° C.

Other types of diene and dienophile polymer arms are shown in (b) and (d). Synthesis of anthracene containing an acrylate monomer followed by atom transfer radical polymerization (ATRP) yields the diene polymer arm in (b). The dienophile polymer arm in (d) can be prepared by synthesizing furan protected maleimide (dienophile) containing monomers followed by ATRP. The two polymer arms: dienophile polymer and diene polymer, can bind to the lignin via a procedure in FIG. 5.

Lignin-Containing Biodegradable Polymers

Raw lignin is a sustainable and biodegradable alternative material for many petroleum-derived substances. In light of this fact, a polymer arm option for a biodegradable lignin-containing polymer is an aliphatic polyester.

Figure 10:
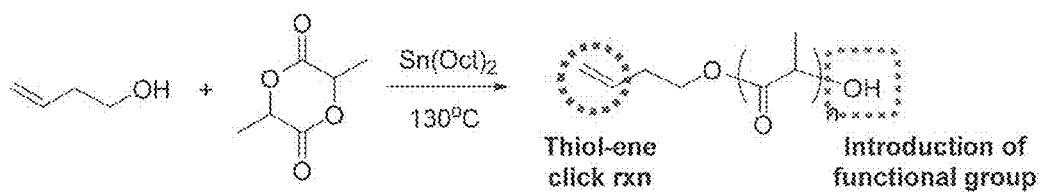
FIG. 10 is a reaction scheme illustrating a route to make a biodegradable polymer arm, which can be bonded to lignin via a thiol-alkene click reaction.

An example of degradable aliphatic polyester is illustrated in FIG. 10. The polymer arm can be bound to lignin via the thiol-alkene click reaction. A hydroxyl group terminal can be used to introduce various functional groups analogous to methods illustrated in FIG. 6. The cyclic ester monomers may include various functional groups instead of methyl group in the scheme.

The aliphatic polyester can be synthesized by organotin catalyzed ring opening polymerization. The polymer chain contains an alkene terminal group suitable for bonding to lignin via a click reaction. The hydroxyl group at the other end can provide additional room for functional modifications. Such a lignin-containing aliphatic polyester may be a substantially fully degradable and an environmentally friendly functional polymer.

Lignin-Containing Electronically Responsive Polymers

Figure 11:
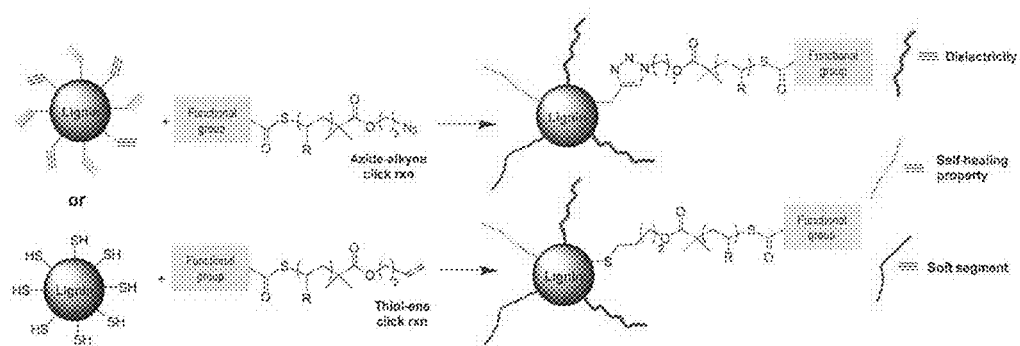
FIG. 11 is a reaction scheme illustrating two methods of making a lignin-containing polymer that is a dielectric elastomer.

FIG. 11 shows some examples of lignin-containing dielectric elastomers. Generally, a dielectric elastomer has low stiffness, high dielectric constant, and high electrical breakdown strength to stand high-frequency operation. A lignin-containing polymer can satisfy these requirements by using differently designed polymer arms. The dielectric elastomer is an important stimulus responsive polymer that has wide range of applications in many high technology industries such as artificial muscles, soft robot materials, sensors, imaging devices, biomedical devices and intelligent surficial materials.

Examples of polymer arms that may be used for this application include poly(n-butyl acrylate), poly(dodecyl methacrylate), poly(octadecyl methacrylate), poly(acrylic acid), and acetyl amino group containing polymers. These lignin-containing polymers may also be self-healing to form a self-healing dielectric elastomer actuator.

The lignin-containing dielectric elastomer has a modular structure and function. It includes lignin and a soft segment and may have dielectricity and self-healing properties. The lignin forms a hard core in the molecular structure and imparts thermoplasticity, sustainability, degradability, and environmentally friendly characteristics. Poly(acrylic acid) is commonly used in dielectric polymers and Poly(n-butyl acrylate), poly(dodecyl methacrylate), and poly(octadecyl methacrylate) have low glass transition temperature ($T_g$), therefore, these polymers may be used as the soft segment.

Additionally, the acetyl amino group containing polymer may be self-healing property because of hydrogen bonding between the polymer's pendant groups.

Because of its modular structure, the properties of the lignin-containing dielectric elastomer can be easily modified by tuning the functionality of the polymer arms. As shown in FIG. 11, the lignin-containing polymer can have multiple functions by using polymers arms with different functions.
Optically Improved Lignin-Containing Polymers Natural lignin has a dark color, which significantly hurts the marketability lignin-containing materials. An optical property may be represented by the refractive index (RI). The higher the RI, the better optical properties of the material. Because a conventional polymer's RI range is 1.3-1.7, simply adding a polymer to lignin may not substantially improve the optical properties of the lignin-containing polymer.

Figure 12:
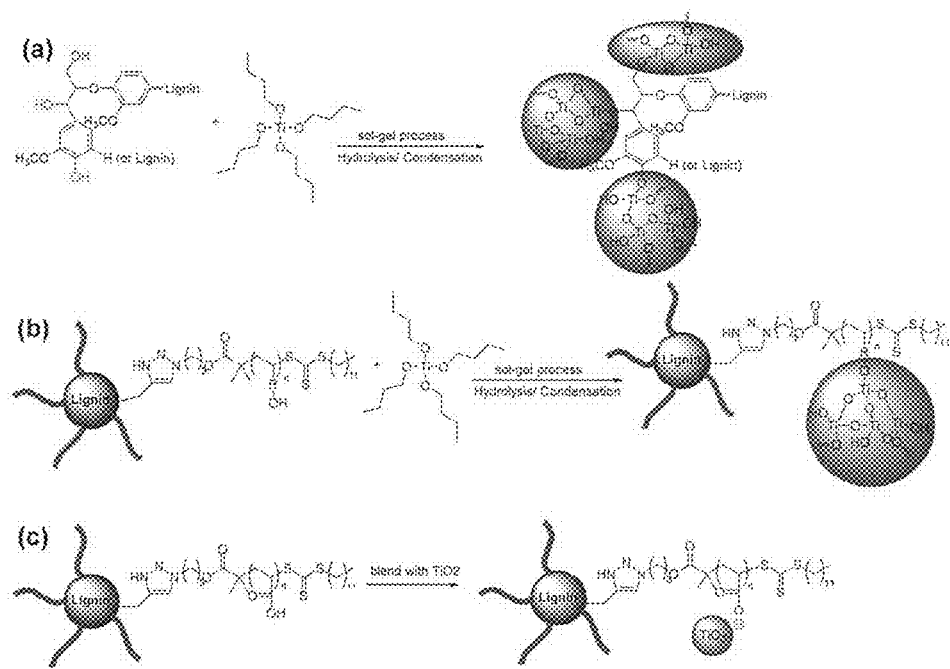
FIG. 12 is a reaction scheme illustrating three methods of making a lignin-containing polymer with a titanium oxide moiety.

Polymer-inorganic hybrid materials may be used to improve the refractive index of lignin-containing polymers relative to natural lignin. FIG. 12 illustrates three synthetic procedures to introduce a titanium oxide moiety to a lignin-containing polymer. Incorporating a titanium oxide moiety may increase the refractive index of the resulting lignin-containing polymer relative to natural lignin. The shaded balls in FIG. 12 highlight the titanium oxide moiety.

Method (a) of FIG. 12 includes covalent bond formation between titanium butoxide and lignin's hydroxyl groups. Due to abundance of the hydroxyl groups on lignin, the amount of titanium butoxide can be varied in wide range from very small to large. This method can improve optical property of lignin without using a polymer.

Method (b) of FIG. 12 uses hydroxyl groups on the polymer arms to hold titanium oxide moiety on a lignin-containing polymer. This method uses reliable covalent bonding between the polymer and titanium butoxide to produce a lignin-containing polymer with substantially homogeneous optical properties.

Method (c) of FIG. 12 uses the carboxylic acid functionality on the poly(acrylic acid) arms to bond with titanium oxide nanoparticles. The carboxylic acid has a binding affinity to various inorganic nanoparticles including metal oxides. Therefore, the titanium oxide nanoparticles can be introduced to a lignin-containing polymer matrix to improve the optical properties. Controlled radical polymerization (CRP) methods may be used to prepare the polymer arms as illustrated in methods (b) and (c) of FIG. 12. Because the CRP methods provide chemically active functional groups at the end of the polymer, sophisticated designed polymer arms can be covalently bonded to a lignin.

In some cases, may be useful to include an antioxidant or reducing agent to retard the photocatalytic reaction that may be caused by $TiO_2$ in the lignin-containing polymer. Examples of reducing agents include hydroquinone, vitamin C (ascorbic acid), tin(II) 2-ethylhexanoate ($Sn(EH)_2$), glucose, hydrazine, and phenyl hydrazine.

EXAMPLES

This section provides specific examples of lignin-containing polymers and experimental results showing the functionality of the methods and lignin-containing polymers. The examples do not limit the scope of possible embodiments of the polymers or methods.

Example 1

Synthesis of Lignin-Containing Polymers

This example describes how a lignin-containing polymer was synthesized.

A. Synthesis of 5-Acetamido-1-Pentanol:

Acetic anhydride (3 ml, 32 mmol) was added in 60 ml of ethyl acetate solution that contained 5-amino-1-pentanol (3 g, 29.1 mmol). The reaction mixture was stirred for 2 hours under a nitrogen atmosphere. After stirring, the solution was reduced by a rotary evaporator. The obtained product was a colorless viscous liquid.

B. Synthesis of 5-Acetylaminopentyl Acrylate Monomer:

5-acetamido-1-pentanol (4.8 mg, 33.1 mmol), acrylic acid (3.41 ml, 49.65 mmol), EDC HCl (10.47 mg, 1.65 mmol), and DIPEA (9.51 ml, 1.65 mmol) were mixed in 90 ml of DCM. After stirring at room temperature reaction for 24 hours, another 90 ml of DCM was added. The solution was washed with 1 M of NaOH aqueous solution, 1 M of HCl aqueous solution, saturated $NaHCO_3$ aqueous solution, and then saturated brine. Yellow solution in an organic layer was recovered and dried over $MgSO_4$. A volatile portion of the solution was evaporated by a rotary evaporator to obtain a pale yellow liquid product.

C. Polymerization of 5-Acetylaminopentyl Acrylate Via RAFT:

AIBN (4.1 mg, 0.025 mmol) and a stir bar were added in a schlenk flask, then 5-acetylaminopentyl acrylate (2 mg, 10 mmol), 2-(Dodecylthiocarbonothioylthio)-2-methylpropionic acid 3-azido-1-propanol ester (42.3 µl, 0.1 mmol) and 7 ml of DMF and 1 µl of pentafluorobenzaldehyde internal standard was added. The reaction mixture was degassed with dry nitrogen for 20 minutes prior to heating at 75° C. The progress of polymerization was monitored by characterizing aliquots at 0 minutes, 30 min, 1 hr 30 min, 3 hr, and 4 hr. The final conversion was 89% at 4 hrs reaction time. The synthesized polymer was recovered by precipitation in cold ether. The crude solid polymer was further purified by dissolving in methanol and precipitate in a cold ether three times. The obtained polymer was dried in vacuo overnight. The resulting polymer was a yellow sticky solid.

Figure 13:
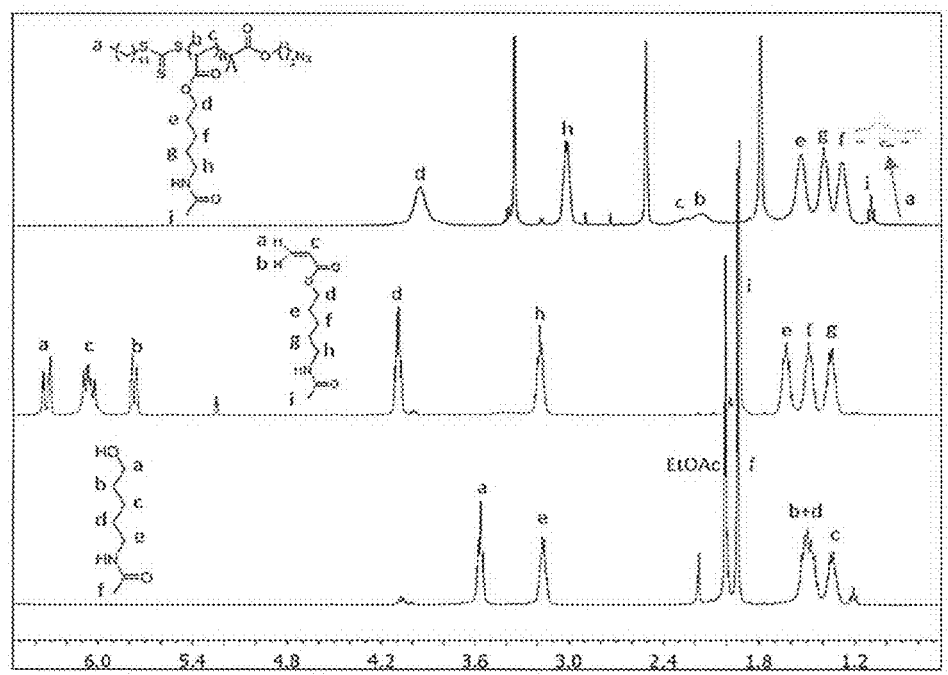
FIG. 13 is a set of proton NMR spectra taken on poly(5-acetylaminopentyl acrylate) (top panel), 5-acetylaminopentyl acrylate (middle panel), and 5-acetamido-1-pentanol (bottom panel).

FIG. 13 shows the $^1H$ NMR spectrum of poly(5-acetylaminopentyl acrylate) in the top panel compared to 5-acetylaminopentyl acrylate in the middle panel, and 5-acetamido-1-pentanol in the bottom panel.

D. Alkyne Functionalization of Lignin:

Lignin 2.0 g (TCI 0045), 2 ml of 5-hexynoic acid and 3.8 g of DCC were added into 50 ml of DMF. 0.28 g of DMAP in 4 ml DMF solution was then added dropwise. The reaction mixture was stirred at room temperature for 48 hours followed by vacuum filteration to remove solids. The remaining black solution was condensed by rotary evaporation and then precipitated in aqueous HCl solution (pH=1). The yielded slurry like solution was vacuum filtered to collect a brown solid. The solid product was dried in vacuum oven for 3 hours, then dissolved in DCM and precipitated in hexane again. The precipitate was filter and dried overnight to yield a brown powder.

Figure 14:
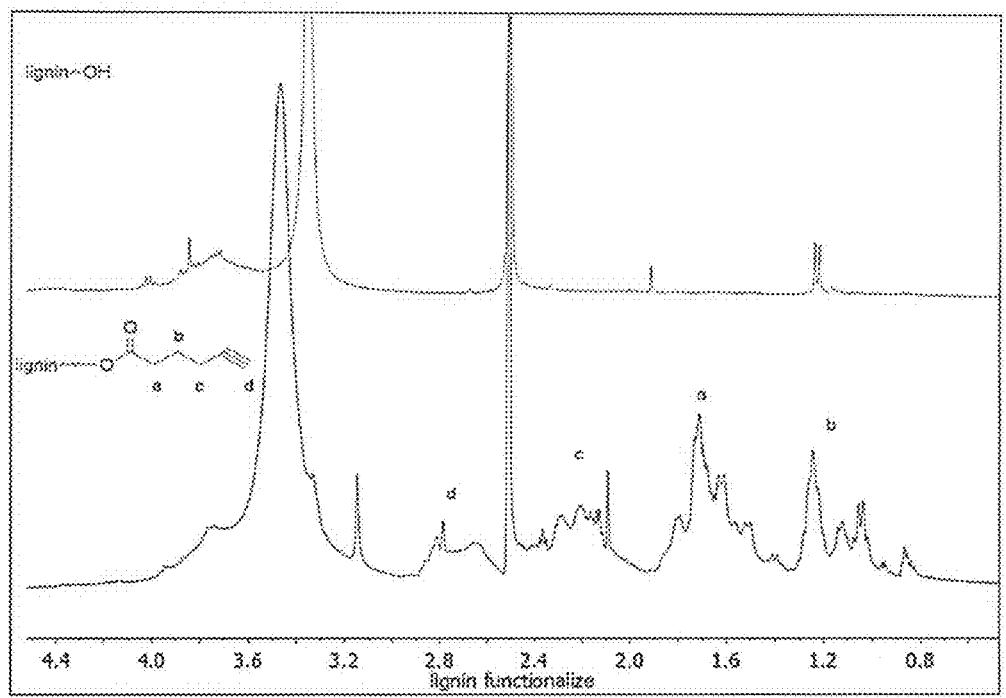
FIG. 14 is a set of proton NMR spectra taken on lignin (top) and alkyne-functionalized lignin.

FIG. 14 shows the $^1H$ NMR spectrum of pristine lignin in the top panel and 5-hexynoic acid functionalized lignin in the bottom panel.

E. Synthesis of a Lignin-Containing Polymer Via Click Chemistry with 10% Wt Lignin-Graft-PAA:

Cu(I)Br (4.7 mg) and 0.1 g of functionalized lignin were mixed in shlenk flask. The reaction mixture was degased with nitrogen for 15 minutes. Then, separately degassed PAA 0.9 g and 6.5 µl of PMDETA in 15 ml of DMF was added through a schlenk flask neck. The reaction was stirred for about 14 hours at room temperature. The reaction was stopped by exposing the flask air and the product was then filtered through neutral alumin packed column to remove residual copper compounds. The obtained solution was reduced by rotary evaporation followed by precipitation in ethyl acetate. The recovered solid products were dried under vacuum overnight.

Figure 15:
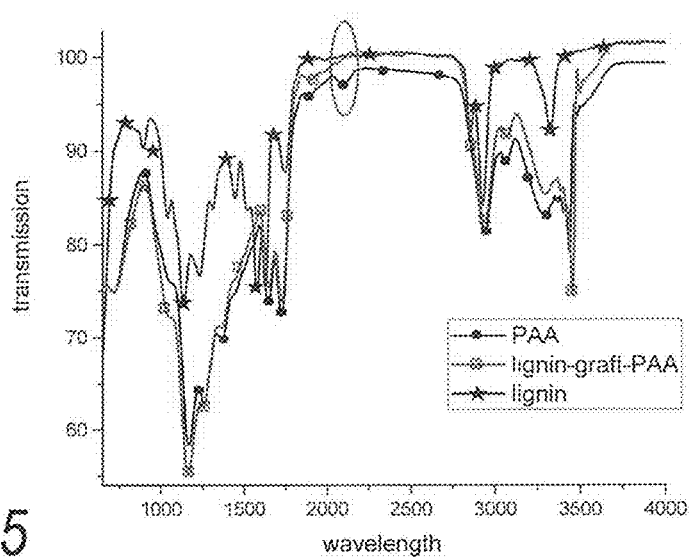
FIG. 15 is a set of FT-IR spectra taken on the polymer arm PAA, lignin, and a lignin-PAA polymer.

Click chemistry forms covalent bonds between the lignin and PAA polymers. The progress of click chemistry can be monitored by disappearance of alkyne functionality on lignin and disappearance of azide functionality on polymer. These functionalities can be identified by FT-IR as shown in FIG. 15. FIG. 15 shows FTIR spectra of lignin, PAA, and the lignin—PAA polymer. Because alkyne functionality on lignin is excess compared to azide functionality on the polymer, the azide group diminution illustrates the progress of the click reaction. The azide's characteristic signal at 2180 nm disappeared after the click reaction.

Synthesis of Other Lignin-Containing Polymers: Other lignin-containing polymers were prepared using poly(5-acetylaminopentyl acrylate) arms by first preparing different azido-terminated poly 5-acetylaminopentyl acrylates polymer arms, the bonding them to lignin using the procedure described above.

FIG. 16 shows five different examples of azido-terminated poly 5-acetylaminopentyl acrylates that were prepared. This table illustrates the usefulness of RAFT to make polymers with different lengths and properties. PDI represents the polydispersity index of the resulting polymer. Mn represents the molecular weight.

FIG. 17 shows six different examples of lignin-containing polymers that were prepared using the poly 5-acetylaminopentyl acrylate polymer arms. The mass ratio of lignin in the click reaction was varied from 10% to 25%. The degree of polymerization of the poly 5-acetylaminopentyl acrylate polymer arms was also varied.

The reaction scheme in FIG. 25 was used to perform the thiol-alkene click reaction under sun light in the presence of a photoredox catalyst. Completion of reaction was confirmed by FT-IR spectrum. In the FT-IR spectrum, signals at 3080 nm and 900 nm corresponded to olefin terminal of poly(acrylic acid) disappeared after the thiol-alkene click reaction.

Example 2

TEM Measurements on a Lignin-Containing Polymer

Figures 18A, 18B:
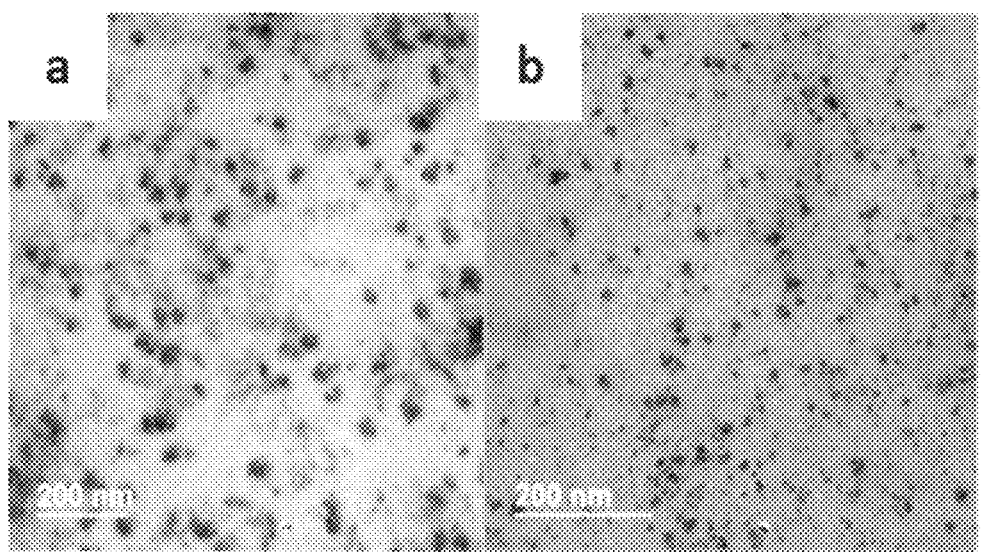
FIG. 18A is a TEM micrograph of a lignin-poly (5-acetylaminopentyl acrylate) polymer where the polymer had DP=20 and contained 10 wt % lignin.
FIG. 18B is a TEM micrograph of a lignin-poly (5-acetylaminopentyl acrylate) polymer where the polymer had DP=500 and contained 15 wt % lignin.

Referring to FIGS. 18A and 18B, transmission electron microscopy (TEM) images were taken on the lignin-poly(5-acetylaminopentyl acrylate) polymer. The dark spots are lignin and the bright sections are the PAA polymer arms. Both TEM images show dispersion of lignin cores throughout. This dispersion of lignin and polymer arms confirms that the click reaction completed and that the lignin and polymer arm were compatible.

FIGS. 18A and 18B also show that lignin particle size is controllable by using different ratios between lignin and polymer arm. For FIG. 18A, about 40 nm lignin particles with 10 wt % lignin and DP 20 polymer (short chain length polymer) was used. For FIG. 18B, lignin particle sizes of about 15 nm with 15 wt % lignin and DP 500 polymer (long chain length polymer) was used. Here, the wt % means that X wt % of lignin was added during click reaction. Thus, the final lignin-containing polymer has 15 wt % lignin and 85 wt % of polymer.

Example 3

Mechanical Property Studies of Synthesized Lignin-Containing Polymers

In lignin-containing polymers, lignin functions as a hard core and the polymer functions like a soft arm as illustrated in Table 1 Due to this combination of hard core and soft arm molecular structure, the mechanical properties of lignin-containing polymers can be tuned by changing the ratio between lignin and polymer arms.

Lignin-containing polymers were prepared using polymers arms with different degrees of polymerization (DP=20, 50, 100, 200, 300, 500) and different wt % ratios between lignin and polymer arm to show that the mechanical properties of the lignin-containing polymers can vary.

FIGS. 19A-C, 20, and 21 summarize the mechanical property studies. When a higher wt % of lignin was used, the lignin-containing polymer tended to be strong and stiff compared to the other samples. For example, when 25 wt % lignin and PAA with DP=500 was used the lignin-containing polymer was very brittle and broke easily.

Figures 20, 21, 22:
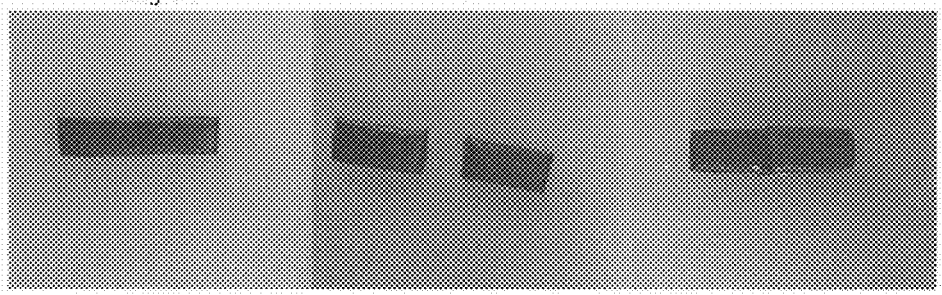
FIG. 20 is a table summarizing tensile test results for samples with different DP and wt % of lignin.
FIG. 21 is a table summarizing more tensile test results for samples with different DP and wt % of lignin.
FIG. 22 is a set of photographs showing how a lignin-containing polymer sample self-healed after being cut.

FIGS. 19A-C are stress-strain plots from tensile tests. As shown in FIGS. 20 and 21, various conditions of lignin-containing polymer samples were prepared. FIG. 20 shows the results summary of different DP polymers where each polymer from entry 1 to entry 5 had different lengths. FIG. 21 shows the results summary for different weight percentage of lignin in the lignin-containing polymer. For example, entries 1 and 2 of FIG. 21 were prepared from the same polymer that has DP 300; but entry 2 has a higher wt % lignin (15%) than entry 1 (10%).

FIG. 19A compares 10 wt %, 15 wt %, and 20 wt % lignin-containing polymer made of DP 500 polymer. Here, the length of polymer arm is fixed, but the wt % of lignin was varied. Among different samples, DP 500 with lignin at 20 wt % showed the highest toughness, modulus, and maximum stress.

In FIG. 19B, the lignin was fixed at 15 wt % and length of polymer was varied between DP 300 and DP 500. The DP 500 sample demonstrated the better mechanical performance. A similar test was performed for FIG. 19C and the results showed a similar result, with the longer polymer chain having better mechanical performance.

Example 4

Self-Healing Studies of Lignin-Containing Polymers

A self-healing study was performed with a lignin-containing polymer having 20 wt % lignin and PAA arms of DP 500. Referring to FIG. 22, rectangular-shaped samples were cut in half and rejoined gently for ten seconds at room temperature. Whole self-healing is done in room temperature.

Figures 23, 24:
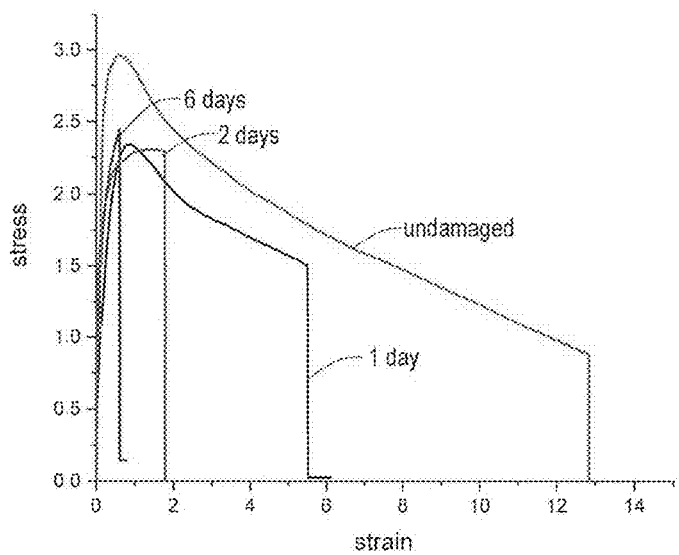
FIG. 23 is a set of stress-strain curves measure on a lignin-poly(5-acetylaminopentyl acrylate) polymer having DP=500 and 20 wt % lignin that was undamaged, healed for 1 day, healed for 2 days, and healed for 6 days.
FIG. 24 is a table summarizing the mechanical properties of the lignin-poly (5-acetylaminopentyl acrylate) polymer having DP=500 and 20 wt % lignin at different healing times.

FIG. 23 shows the stress-strain curves of the undamaged polymer sample compared to healed polymer samples that were allowed to heal at room temperature for 1 day, 2 days, and 6 days. FIG. 24 summarizes the tensile test results. The self-healed lignin-containing polymers recovered 80% of their original strength regardless of healing time.

That which is claimed is:

1. A polymer material comprising:
   a first compound including a first lignin-based core with a first plurality of polymers attached to the first lignin-based core; and
   a second compound including a second lignin-based core with a second plurality of polymers attached to the second lignin-based core;
   wherein the first and second plurality of polymers interact and hold the first and second compounds together to form a monolithic product including the first compound and second compound;
   wherein the monolithic product includes a Diels-Alder adduct that holds the first and second compounds together.

2. The polymer material of claim 1, wherein the monolithic product includes hydrogen bonding that holds the first and second compounds together.

3. The polymer material of claim 1, wherein the first and second plurality of polymers are attached to their respective lignin-based cores via a triazole ring.

4. The polymer material of claim 1, wherein the first and second lignin-based cores have a major dimension of 1-1000 nm.

5. The polymer material of claim 1, wherein the monolithic product includes 10 wt % to 50 wt % lignin.

6. The polymer material of claim 1, wherein at least one of the first plurality of polymers and second plurality of polymers includes a polyethylene glycol segment.

7. The polymer material of claim 1, wherein at least one of the first plurality of polymers and second plurality of polymers includes poly(n-butyl acrylate).

8. The polymer material of claim 1, wherein at least one of the first plurality of polymers and second plurality of polymers includes a poly-acrylate polymer.

9. A polymer material comprising:
   a first compound including a first lignin-based core with a first plurality of polymers attached to the first lignin-based core; and
   a second compound including a second lignin-based core with a second plurality of polymers attached to the second lignin-based core;
   wherein the first and second plurality of polymers interact and hold the first and second compounds together to form a monolithic product including the first compound and second compound;
   wherein at least one of the first plurality of polymers and second plurality of polymers includes a diene and/or dienophile group.

10. A polymer material comprising:
    a first compound including a first lignin-based core with a first plurality of polymers attached to the first lignin-based core; and
    a second compound including a second lignin-based core with a second plurality of polymers attached to the second lignin-based core;
    wherein the first and second plurality of polymers interact and hold the first and second compounds together to form a monolithic product including the first compound and second compound;
    wherein at least one of the first plurality of polymers and second plurality of polymers includes at least one amino acid.

11. The polymer material of claim 9, wherein the first and second plurality of polymers are attached to their respective lignin-based cores via a triazole ring.

12. The polymer material of claim 9, wherein the first and second lignin-based cores have a major dimension of 1-1000 nm.

13. The polymer material of claim 9, wherein the monolithic product includes 10 wt % to 50 wt % lignin.

14. The polymer material of claim 9, wherein at least one of the first plurality of polymers and second plurality of polymers includes a polyethylene glycol segment.

15. The polymer material of claim 9, wherein at least one of the first plurality of polymers and second plurality of polymers includes poly(n-butyl acrylate).

16. The polymer material of claim 9, wherein at least one of the first plurality of polymers and second plurality of polymers includes a poly-acrylate polymer.

17. The polymer material of claim 10, wherein the first and second plurality of polymers are attached to their respective lignin-based cores via a triazole ring.

18. The polymer material of claim 10, wherein the first and second lignin-based cores have a major dimension of 1-1000 nm.

19. The polymer material of claim 10, wherein the monolithic product includes 10 wt % to 50 wt % lignin.

20. The polymer material of claim 10, wherein at least one of the first plurality of polymers and second plurality of polymers includes a polyethylene glycol segment.

21. The polymer material of claim 10, wherein at least one of the first plurality of polymers and second plurality of polymers includes poly(n-butyl acrylate).

22. The polymer material of claim 10, wherein at least one of the first plurality of polymers and second plurality of polymers includes a poly-acrylate polymer.

* * * * *